2,825,423
SEPARATOR

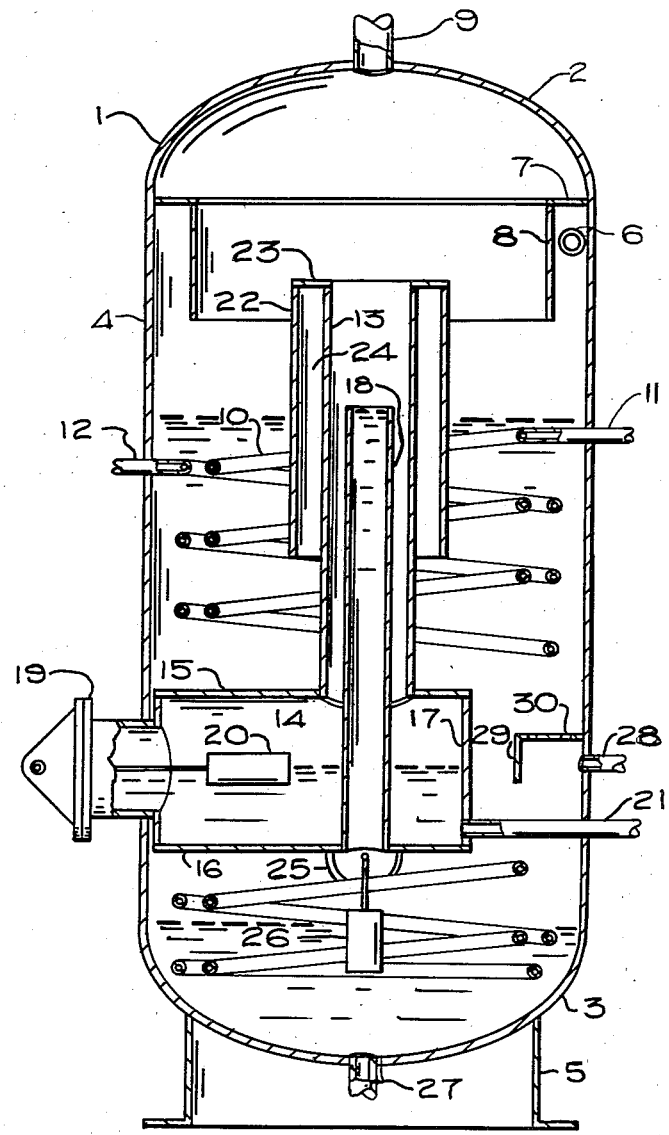

William L. Scheirman, Oklahoma City, Okla., and Glen C. Opel, Baton Rouge, La., assignors to Black, Sivalls & Bryson, Inc., Kansas City, Mo., a corporation of Delaware Application February 20, 1956, Serial No. 566,666

3 Claims. (Cl. 183—2.7)

The present invention relates generally to a vapor-liquid separator. More specifically the present invention relates to a separator used to separate hydrocarbon condensate and water from gas in the processing of high pressure natural gas wellstreams.

A separator for use in processing high pressure natural gas wellstreams at low temperatures usually is designed to have a gas inlet between an upper gas outlet and a lower liquid collecting space. This design allows the formation of a cold blanket of gas above the collected liquids and has been previously described and is well known in the art. Separators for this type service are usually required to make a separation between the two immiscible liquids collecting in the lower portion thereof and to provide sufficient heat to said collected liquids to melt hydrates and prevent freezing. The separation of the two liquids is complicated by the convection currents incidental to the heating and is further hindered by the dumping into the collected liquids of other liquids which have been separated from the gas stream prior to its introduction into the separator. The separation of the condensed liquids from the denuded gas is a problem in such separators since most mist extractors or eliminators would soon become blocked by the gas hydrates formed in the low temperature gas. Also, since in most units the gas stream is expanded through a choke directly into the separator, the attendant high entrance velocities cause much turbulence and prevent adequate separation of the liquids entrained in the gas.

Therefore, the primary object of the present invention is to provide an apparatus which may be used as a separator in low temperature systems of processing high pressure natural gas.

Further objects of the present invention are to provide an apparatus to separate two liquids and a gas having heating means for the liquids; to provide a separator which utilizes the entrance velocities of the flow stream as an aid to the separation of entrained liquids and solids in the gas component of the flow; and to provide an apparatus for separating two immiscible liquids and a gas which makes provision for the dumping of liquids into the body of collected liquids without interfering with the normal gravity separation of the two liquids.

In accomplishing these and other objects of the present invention we have provided improved appaartus illustrated in the accompanying drawing wherein:

The figure is a sectional view of an apparatus constructed in accordance with the present invention.

1 designates a separator which is formed of heads 2 and 3 and a cylindrical shell 4. Base 5 is secured to lower head 3 and provides adequate support for separator 1.

Inlet duct 6 extends through shell 4 and is constructed to discharge the flow stream tangentially onto the inner surface of shell 4. Annular plate 7 is positioned slightly above the opening of inlet duct 6 in shell 4 and is secured around its outer periphery to the inner surface of shell 4. Flange 8 depends from the inner periphery of plate 7 a substantial distance below the opening of inlet duct 6 into shell 4. Gas outlet duct 9 is shown extending through the central portion of upper head 2 but it may be positioned any place in the upper portion of separator 1 above plate 7.

Heating coil 10 is positioned within the lower portion of separator 1 and is connected to inlet duct 11 and outlet duct 12.

Tubular member 13 is positioned centrally within shell 4 extending from a position above the lower edge of flange 8 and terminating in a hydrocarbon liquid collecting zone 14. Zone 14 is bounded by upper plate 15 through which tubular member 13 extends, lower plate 16 and side wall 17.

A second tubular member 18 extends through lower plate 16, zone 14 and a substantial distance into tubular member 13 where the walls of member 18 are spaced from the walls of member 13 as shown in the figure. Liquid lever controller connection 19 extends through shell 4 and side wall 17 to provide access to zone 14 for float 20 or other liquid level sensing device. Outlet duct 21 extends out through side wall 17 and shell 4 and has a suitable control valve (not shown) controlling the liquid discharge from zone 14 in response to the level of the liquid therein as indicated by float 20.

Tubular member 22 is positioned in surrounding spaced relationship with member 13 and has its upper edge at the same level as the upper edge of member 13. These upper edges of members 13 and 22 are joined by annular ring 23. Member 22 extends downwardly around member 13 providing a dead gas space 24 therebetween and terminates a short distance above plate 15.

Liquid level controller connection 25 is provided in the lower portion of separator 1 for interface float 26 or other interface sensing device. A water outlet duct 27 extends through head 3 and has a valve (not shown) controlling the water being dumped from separator 1 in response to the level of the hydrocarbon condensate-water interface as indicated by float 26. Duct 28 is provided for the discharge of previously separated liquids into separator 1. Duct 28 extends through shell 4 and terminates in a small compartment composed of baffle plate 29 and upper perforated plate 30.

In operation, the influent stream is discharged into separator 1 through inlet duct 6. Generally a pressure reducing valve or choke (not shown) is used to provide the requisite pressure drop to the point of maximum condensation of the desirable constituents of the stream and to provide sufficient expansion refrigeration to obtain the desired separation temperature. Thus, the influent stream is discharged onto the inner surface of shell 4 at high velocities. Annular plate 7 prevents the stream from spreading into the upper portion of separator 1 and possible loss of some of the valuable hydrocarbon condensate through gas outlet duct 9. Also, flange 8, by extending downwardly to a level below the entrance of inlet duct 6, prevents the gas from flowing directly to outlet duct 9. This feature allows the height of separator 1 to be substantially reduced since a direct flow path to gas outlet duct 9 is prevented. Thus, by causing the gas to flow downwardly and then upwardly to gas outlet duct 9, the reversal of flow will cause any entrained liquids and solids to be dropped out of the gas stream. The high entrant velocity provides a centrifugal type separation of the gas and liquid phases of the flow stream and the confined space between flange 8 and shell 4 causes the flow stream to maintain its high entrant velocity much longer than it would under conditions of the inlet stream not being confined. This additional high velocity will prolong the liquid separation due to centrifugal action.

The separated condensed liquids and solids (usually hydrocarbon condensate, water and gas hydrates) flow down the inner surface of shell 4 and collect in the lower portion of separator 1 and are heated by heating coils 10 to melt and decompose gas hydrates. This heating is usually accomplished by initially flowing the warm flow stream through inlet duct 11, heating coils 10 and outlet duct 12. It should be noted that any other fluid which is readily available and which possesses the necessary warmth for this heating may be used without departing from the spirit of the present invention.

The liquids condensed in separator 1 and those dumped into separator 1 through duct 28 are usually a mixture of hydrocarbon condensates and water. The water may contain some hydrate inhibitor but since inhibitors are selected to be immiscible with hydrocarbon condensates they will not affect the normal water and condensate separation. These liquid components are immiscible and therefore may be readily separated by providing a stilling chamber or zone and the proper decanting structure. Thus, the lower portion of separator 1 is a stilling zone. Baffle 29 and plate 30 are provided to prevent turbulence in the stilling zone of separator 1 when liquids are dumped therein through duct 28. Heating coil 10 extends down into the water collecting in the lower portion of separator 1 to prevent it from freezing and to melt any hydrates which might reach this lower portion of separator 1 without melting.

As previously described, the liquids separated from the influent stream collect in the lower portion of separator 1 by flowing down the inner surface of shell 4. The separation of the hydrocarbon condensate and water takes place because of their different specific gravities. The water, being heavier, will settle to the bottom of separator 1 and may be discharged therefrom through water outlet duct 27. Float 26 is adjusted to cause the discharge of sufficient water through water outlet duct 27 to maintain the interface between the water and hydrocarbon condensate well below lower plate 16. Since the separated hydrocarbon condensate has to flow up through tubular member 18 to be discharged, it is necessary to maintain the hydrocarbon condensate water interface well below the lower opening of tube 18 to prevent the discharge of water with the hydrocarbon condensate.

The upper edge of tubular member 18 is positioned at a height to maintain the desired level of liquids in separator 1. This desired level should be above the upper coil of heating coils 10. The separated hydrocarbon condensate overflowing the upper edge of member 18 collects in hydrocarbon liquid collecting zone 14. The collected hydrocarbon condensate is discharged from zone 14 through duct 21 under the control of a valve (not shown) in response to the level of the hydrocarbon condensate in zone 14 as indicated by float 20 or other liquid level sensing device.

Dead gas space 24 between members 13 and 22 provides an insulating shield between the cold separated gas and the liquid flowing up through and over the upper edge member 18 within member 13. The purpose of space 24 is to prevent the freezing of any water which might be entrained in the hydrocarbon condensate in member 18 without having to provide a special heating coil within member 13.

The inlet construction (annular plate 7 and flange 8) is such that any hydrates formed will fall or be carried directly to the lower portion of separator 1. Also, the smoothness of the inner surface of shell 4 is such as to prevent the collection of hydrates when there is fluid flow over such surface. The surface of steel plate normally used in the manufacture of low temperature separators has sufficient smoothness to prevent hydrate collection thereon as previously discussed.

From the foregoing it may be seen that we have provided an improved apparatus for separating hydrocarbon condensate water and gas of a high pressure natural gas. Also, we have provided a vertical low temperature separator having a novel inlet baffle which allows a reduction in separator height without the usual concomitant reduction in capacity of the separator. We have further provided a low temperature separator with novel structure to prevent freezing of the liquids collecting therein and having a novel structure to allow the entrance of other condensates separated from the gas stream without interference with the gravity separation of hydrocarbon condensate and water.

What we claim and desire to secure by Letters Patent is:

1. A gas-oil-water separator comprising, a vessel, an inlet into the upper portion of said vessel, a gas outlet from said vessel above said inlet, a water outlet in the lower portion of said vessel, a hydrocarbon liquid collecting chamber above said water outlet and below said inlet, an overflow pipe connected to said chamber and extending a substantial distance above said chamber, a tubular member connected to said chamber extending upwardly in surrounding relationship to said overflow pipe and terminating in the upper portion of said vessel substantially above the upper portion of said overflow pipe, an insulating member connected to and surrounding the upper portion of said tubular member and extending downwardly a substantial distance to form an insulating space surrounding said tubular member, means connecting the lower portion of said vessel to said overflow pipe to allow hydrocarbon condensate to overflow said pipe and flow into said chamber, an outlet from said chamber, means controlling the discharge of hydrocarbon condensate from said chamber and means controlling the discharge of water from the lower portion of said vessel through said water outlet.

2. A high pressure gas-oil-water separator comprising, a vertical vessel, a tangential inlet into said vessel, a gas outlet from said vessel above said inlet, a liquid collecting zone in said vessel below said inlet, a water outlet from said vessel below said inlet, an oil and hydrocarbon condensate collecting chamber below said inlet and above said water outlet, a first upstanding pipe connected to an opening in the lower wall of said chamber and extending upwardly above said chamber to approximately the desired level of liquid in said zone, a second upstanding pipe surrounding the upper portion of said first pipe, said second pipe being connected to an opening in the upper wall of said chamber and extending upwardly a substantial distance above the uppermost portion of said first pipe, a shielding member spaced radially outward from said second pipe and extending downward a substantial distance below said desired liquid level, means connecting the upper edges of said shielding member and said second pipe, an outlet duct from said chamber extending out through said vessel, means controlling the water level in the lower portion of said vessel and means controlling the oil and hydrocarbon condensate level in said chamber.

3. Invention according to claim 2 including, a liquid inlet into said vessel below said desired liquid level, and baffle means to prevent excessive turbulence due to the discharge of liquid into the body of liquids collecting in said liquid collecting zone.

References Cited in the file of this patent
UNITED STATES PATENTS

| | | |
|---|---|---|
| 1,925,491 | Lorraine | Sept. 5, 1933 |
| 2,528,028 | Barry | Oct. 31, 1950 |
| 2,738,026 | Glasgow et al. | Mar. 13, 1956 |
| 2,747,002 | Walker et al. | May 22, 1956 |